(12) United States Patent
Wang

(10) Patent No.: US 10,321,209 B2
(45) Date of Patent: *Jun. 11, 2019

(54) SMART METER SYSTEM COMMUNICATION METHODS

(71) Applicant: International Technological University, San Jose, CA (US)

(72) Inventor: Karl L. Wang, Los Altos, CA (US)

(73) Assignee: International Technological University, San Jose, CA (US)

(*) Notice: Subject to any disclaimer, the term of this patent is extended or adjusted under 35 U.S.C. 154(b) by 132 days.

This patent is subject to a terminal disclaimer.

(21) Appl. No.: 15/452,978

(22) Filed: Mar. 8, 2017

(65) Prior Publication Data

US 2017/0180831 A1  Jun. 22, 2017

Related U.S. Application Data

(63) Continuation of application No. 14/330,736, filed on Jul. 14, 2014, now Pat. No. 9,612,133.

(51) Int. Cl.
*H04L 29/08* (2006.01)
*H04Q 9/00* (2006.01)
(Continued)

(52) U.S. Cl.
CPC .............. *H04Q 9/00* (2013.01); *G01D 4/002* (2013.01); *G01D 18/00* (2013.01); *H04L 45/26* (2013.01);
(Continued)

(58) Field of Classification Search
CPC ........... H04L 29/08; H04L 67/12; H04Q 9/00; G01D 4/002
See application file for complete search history.

(56) References Cited

U.S. PATENT DOCUMENTS 3,152,250 A   10/1964  Platzer, Jr.
4,417,099 A   11/1983  Pierce
(Continued)

FOREIGN PATENT DOCUMENTS

GB   1542290     3/1979
WO   WO9624070   8/1996

OTHER PUBLICATIONS

The International Search Report and the Written Opinion of the International Searching Authority issued for International Application No. PCT/US2015/040218, dated Jan. 6, 2016.
(Continued)

*Primary Examiner* — Wei Zhao
(74) *Attorney, Agent, or Firm* — Brundidge & Stanger, P.C.

(57) ABSTRACT

An improved data packet design that can be used in a variety of data communication standards used in smart meter systems is disclosed. In an embodiment a smart meter system that comprises of a local server, a coordinator and a plurality of smart meters in the many-to-one data communication system configuration. The smart meter uses a variety of types of radio frequency data packets. The data packets contain the commands, parameters, and data for system control and data transmission. The data packet designs are disclosed for a route discovery command, a get parameter command, a set parameter command, a get data command, a reset command, a relay command, a start command, and a calibration command that are used in the smart meter system.

20 Claims, 9 Drawing Sheets

(51) Int. Cl.
*G01D 4/00* (2006.01)
*H04L 12/721* (2013.01)
*G01D 18/00* (2006.01)

(52) U.S. Cl.
CPC ............ *H04L 67/12* (2013.01); *Y02B 90/241* (2013.01); *Y02B 90/246* (2013.01); *Y04S 20/32* (2013.01); *Y04S 20/42* (2013.01); *Y04S 40/18* (2018.05)

(56) References Cited

U.S. PATENT DOCUMENTS

| | | | |
|---|---|---|---|
| 4,437,059 A | 3/1984 | Hauptmann | |
| 4,896,106 A | 1/1990 | Voisine et al. | |
| 5,325,048 A | 6/1994 | Longini | |
| 5,450,007 A | 9/1995 | Payne et al. | |
| 5,773,978 A | 6/1998 | Becker | |
| 6,665,620 B1 | 12/2003 | Burns et al. | |
| 7,421,205 B2 | 9/2008 | Ramirez | |
| 7,768,424 B2 | 8/2010 | Harvey et al. | |
| 8,228,209 B2 | 7/2012 | Smith | |
| 8,234,017 B2 | 7/2012 | Ahn | |
| D668,983 S | 10/2012 | Manion et al. | |
| 8,466,803 B2 | 6/2013 | Jonsson et al. | |
| 8,509,109 B2 | 8/2013 | Guo et al. | |
| 8,587,290 B2 | 11/2013 | Pamulaparthy et al. | |
| 8,593,135 B2 | 11/2013 | Chemel et al. | |
| 8,654,711 B2 | 2/2014 | Guo et al. | |
| D701,784 S | 4/2014 | Manion et al. | |
| 8,750,100 B2 | 6/2014 | Guo et al. | |
| 9,612,133 B2 * | 4/2017 | Wang | G01D 4/002 |
| 2004/0254750 A1 | 12/2004 | Macfarlene et al. | |
| 2007/0016539 A1 | 1/2007 | Groft et al. | |
| 2008/0042873 A1 | 2/2008 | Harvey et al. | |
| 2008/0048883 A1 | 2/2008 | Boaz | |
| 2009/0034418 A1 | 2/2009 | Flammer et al. | |
| 2009/0135018 A1 | 5/2009 | Veillette et al. | |
| 2009/0198384 A1 | 8/2009 | Ahn | |
| 2010/0039263 A1 | 2/2010 | Chen et al. | |
| 2010/0131329 A1 | 5/2010 | An et al. | |
| 2010/0253538 A1 | 10/2010 | Smith | |
| 2011/0049984 A1 | 3/2011 | Son | |
| 2011/0279353 A1 | 11/2011 | Son et al. | |
| 2011/0283060 A1 * | 11/2011 | Ware | G06F 13/1636 711/106 |
| 2012/0026715 A1 | 2/2012 | Manion et al. | |
| 2012/0083937 A1 * | 4/2012 | Kong | G06Q 50/06 700/295 |
| 2012/0123709 A1 | 5/2012 | Chen et al. | |
| 2012/0124367 A1 | 5/2012 | Ota et al. | |
| 2012/0131324 A1 | 5/2012 | Ansari et al. | |
| 2012/0137126 A1 | 5/2012 | Matsuoka et al. | |
| 2012/0200424 A1 | 8/2012 | Nishizawa et al. | |
| 2012/0231828 A1 | 9/2012 | Wang et al. | |
| 2012/0249121 A1 | 10/2012 | Pamulaparthy et al. | |
| 2012/0280832 A1 | 11/2012 | Jonsson et al. | |
| 2012/0280833 A1 | 11/2012 | Jonsson et al. | |
| 2012/0287596 A1 | 11/2012 | Manion et al. | |
| 2012/0327792 A1 | 12/2012 | Guo et al. | |
| 2013/0015716 A1 | 1/2013 | Matsushima et al. | |
| 2013/0057367 A1 | 3/2013 | Smith | |
| 2013/0077610 A1 | 3/2013 | Amini et al. | |
| 2013/0079938 A1 | 3/2013 | Lee et al. | |
| 2013/0208583 A1 | 8/2013 | Guo et al. | |
| 2013/0223334 A1 | 8/2013 | Guo et al. | |
| 2013/0262844 A1 | 10/2013 | Hester | |
| 2013/0300576 A1 | 11/2013 | Sinsuan et al. | |
| 2014/0039699 A1 | 2/2014 | Forbes | |
| 2014/0153536 A1 * | 6/2014 | Ouchi | H04W 52/146 370/329 |
| 2014/0156093 A1 | 6/2014 | Brian et al. | |
| 2014/0167979 A1 | 6/2014 | Soma et al. | |
| 2014/0277788 A1 | 9/2014 | Forbes, Jr. | |
| 2016/0011006 A1 | 1/2016 | Wang | |

OTHER PUBLICATIONS

The International Search Report and the Written Opinion of the International Searching Authority issued for International Application No. PCT/US2015/040213, dated Oct. 30, 2015.

The International Search Report and the Written Opinion of the International Searching Authority issued for International Application No. PCT/US2015/040201, dated Dec. 28, 2015.

* cited by examiner

*Figure 2*
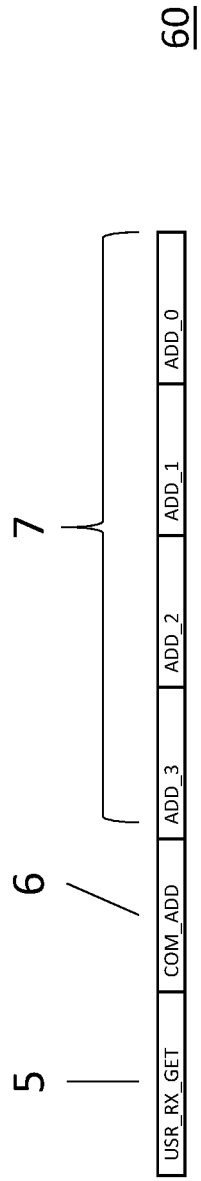
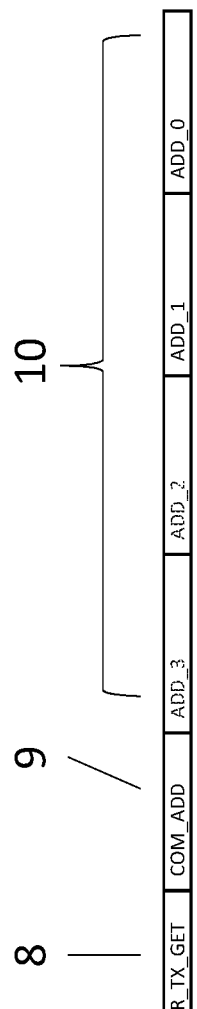
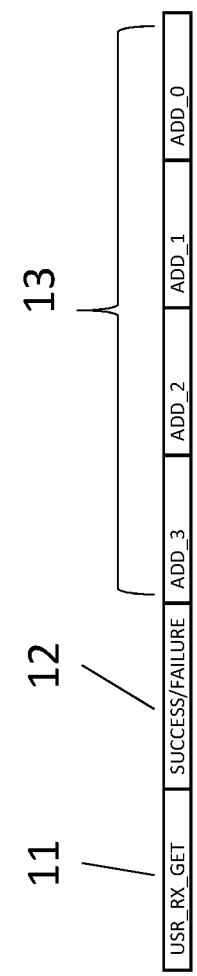

*Figure 5*
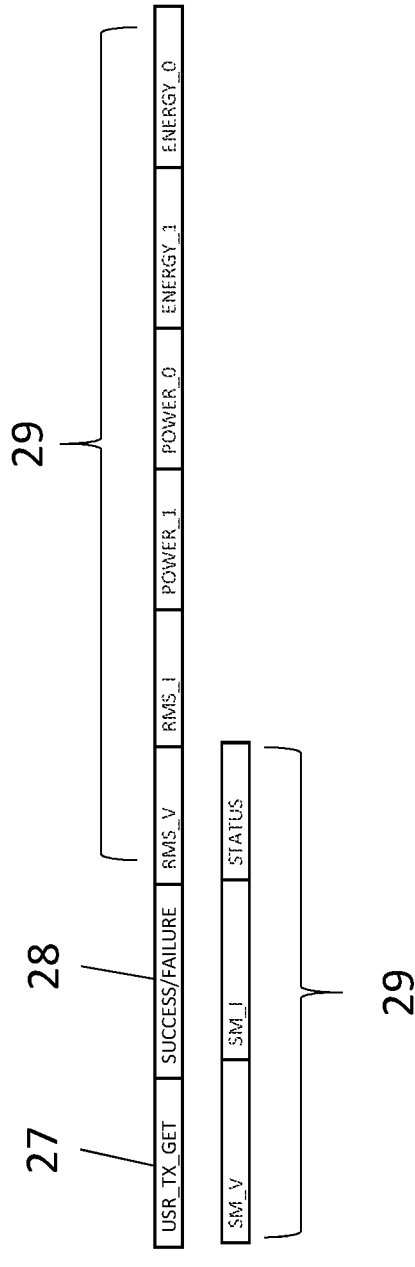

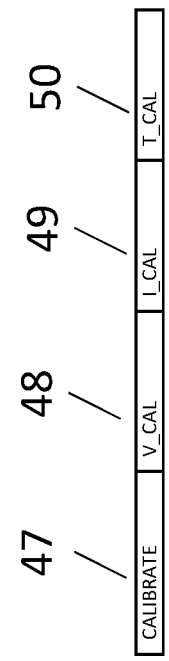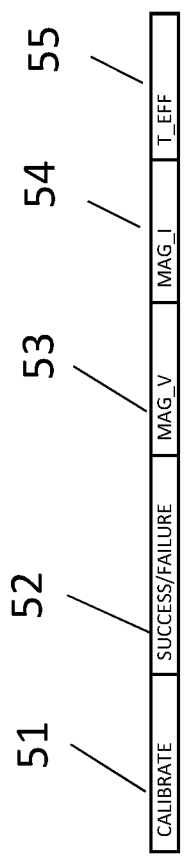
Figure 9

SMART METER SYSTEM COMMUNICATION METHODS

CROSS-REFERENCE TO RELATED APPLICATION

The present application is a Continuation Application of U.S. application Ser. No. 14/330,736, filed Jul. 14, 2014, the contents of which are incorporated herein by reference.

FIELD OF THE INVENTION

The present invention is related generally to meters for measuring power and more particularly to a smart meter system.

BACKGROUND OF THE INVENTION

A smart meter system is an interconnected system comprises a local server connected to a coordinator that is linked to many smart meters. The voltage, current, power, and energy data measured by the smart meters are typically sent to the coordinator for determining power usage. The data received at the coordinator is stored in a database in either the local server or in a public network such as the Internet cloud. Commands used in the smart meter system for controlling the data transmission are sent from the local server and transmitted by the coordinator to the smart meters. There is a need to enhance system performance, reliability, testability and manufacturability of the overall system during the product production and prototyping. Accordingly, what is needed is a system and method that addresses such needs. The system and method must be easily implemented, cost effective and adaptable to existing systems. The present invention addresses such a need.

SUMMARY OF THE INVENTION

An improved data packet design that can be used in a variety of data communication standards used in smart meter systems is disclosed. In an embodiment a smart meter system that comprises of a local server, a coordinator and a plurality of smart meters in the many-to-one data communication system configuration. The smart meter system uses a variety of types of data packets. The data packets contain the commands, parameters, and data for system control and data transmission. The data packet designs are disclosed for a route discovery command, a get parameter command, a set parameter command, a get data command, a reset command, a relay command, a start command, and a calibration command that are used in the smart meter system.

BRIEF DESCRIPTION OF THE DRAWINGS

FIG. 2 is an illustration of the route discovery command, showing the route discovery command, route discovery response message, and route discovery acknowledgment message.

FIG. 5 is an illustration of the get data command, showing the get data command and get data response message.

FIG. 9 is an illustration of the calibration command, showing the calibration command and calibration response message.

DETAILED DESCRIPTION OF THE PREFERRED EMBODIMENT

The present invention is related generally to meters for measuring power and more particularly to a smart meter system. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
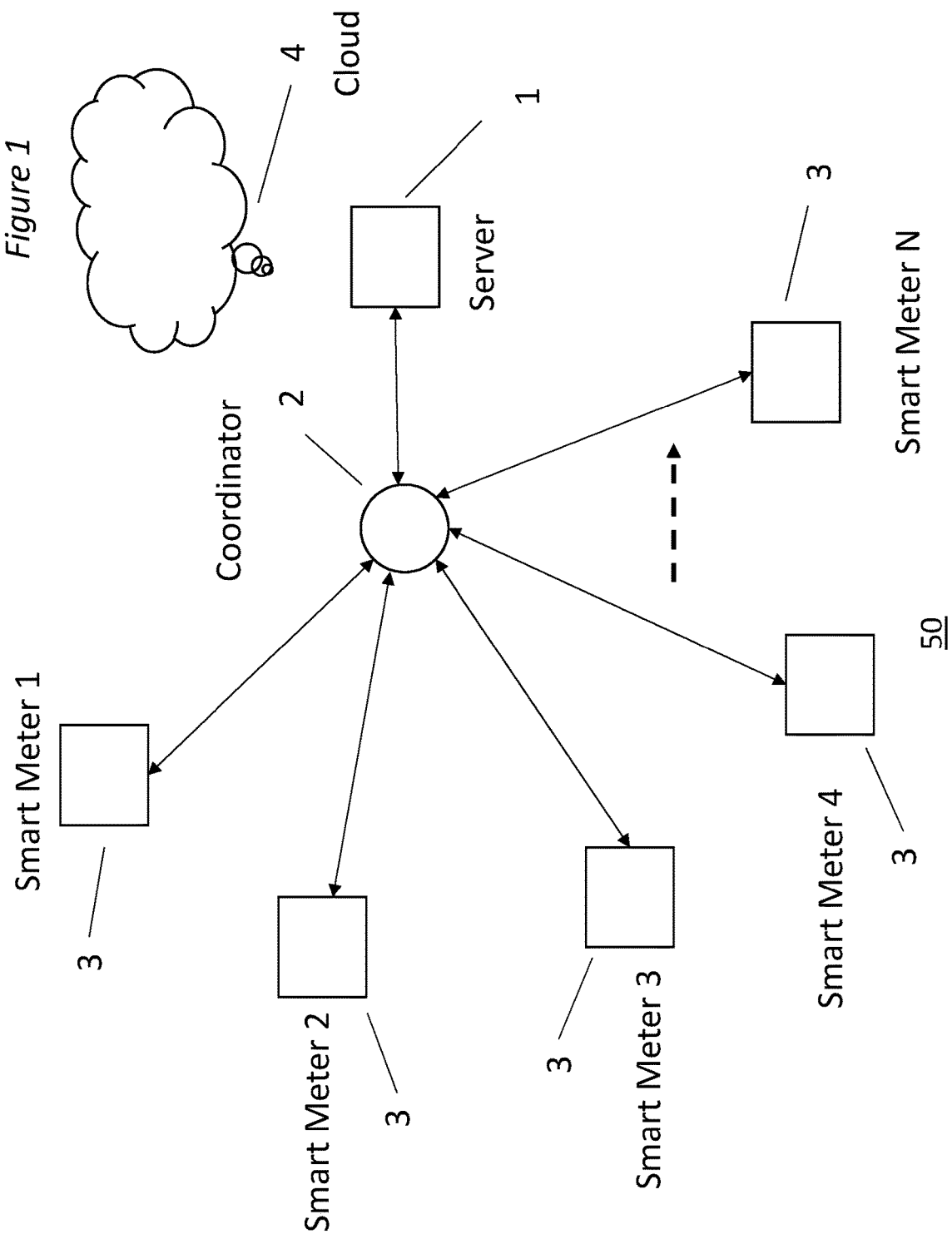
FIG. 1 is an illustration of a smart meter system according to a preferred embodiment of the invention.

FIG. 1 is an illustration of a smart meter system 50 according to an embodiment of the invention in a radio frequency (RF) data communication system e.g. Zig Bee that may or may not support an industry standard such as IEEE 802.14.5. Although in a preferred embodiment the data packets are transmitted over the communication system wirelessly via a standardized protocol, one of ordinary skill in the art readily recognizes the data packets could be transmitted over wires and/or using any type of protocol and that use would be within the spirit and scope of the present invention.

The smart meter system 50 comprises a local server 1 connected to a coordinator 2 and smart meters 3 (smart meter 1-N). In one embodiment, the local server 1 is connected to the coordinator 2 via wires. In another embodiment, the local server 1 is connected to the coordinator 2 wirelessly.

The smart meter system 50 is a many-to-one data communication topology. In this embodiment, the local server 1 issues a command to the coordinator 2 which executes the command by sending a corresponding data packet wirelessly to the smart meters 3 by a RF link. Then the smart meters 3 send an appropriate response back to the coordinator 2 by the same RF link. Power usage data sent by the smart meters 3 can be stored in a database hosted in the local server 1 or an internet cloud 4.

The smart meter system 50 uses a variety of types of data packets to improve the functionality of the smart meter system. The data packets contain the commands, parameters, and data for system control and data transmission. The data packets are categorized into three command types, command type 1, command type 2 and command type 3. Data packets in accordance with command type 1 comprise special commands such as for example a route discovery command. Data packets in accordance with command type 2 comprise normal commands including but not limited to a get parameter command, set parameter and get data command. Data packets in accordance with command type 3 comprise control commands including but not limited to a reset command, a relay command, a start command, and a calibrate command that are used in the smart meter system.

Each of the above described data packets have a plurality of fields therein. One of ordinary skill in the art readily recognizes there could be more or less fields in any of the data packets and those data packets use would be within the spirit and scope of the present invention. In addition the fields could be in any order or could of different types and that would also be within the spirit and scope of the present invention.

The power usage can be accessed for example by displaying web pages using any device that is connected to the local server or the internet. The database can be analyzed to determine optimal power usage and distribution. The power usage can also be analyzed to enable system control, e.g. cut off the power if necessary.

To set up the smart meter system 50, the local server 1 sends a route discovery command to the coordinator 2. FIG. 2 is an illustration of a packet of the route discovery command, showing the route discovery command in accordance with an embodiment, showing a route discovery response message, and a route discovery acknowledgment message. The data packet 60 comprises a communication type identification field (USR_RX_GET) 5, a command type identification field (COM_ADD) 6, and a coordinator address identification field 7, that comprises as a 4-word address, ADD_3, ADD_2, ADD_1, ADD_0.

When the route discovery broadcast command is received by the plurality of smart meters, a route discovery response message is sent out after a random delay. Such delay is necessary to minimize the chance of collisions from transmissions of route discovery response messages from all the smart meters. The route discovery response message comprises of a communication type identification field (USR_TX_GET) 8, a command type identification field (COM_ADD) 9, and a smart meter address field 10, that comprises of a 4-word address, ADD_3, ADD_2, ADD_1, ADD_0.

When the route discovery response message is received by the coordinator, a route discovery acknowledge message is sent from the coordinator back to the smart meter. The route discovery acknowledge message comprises of a communication type identification field (USR_RX_GET) 11, a command type identification field (COM_ADD) 12, and a coordinator address field 13 that comprises of a 4-word address, ADD_3, ADD_2, ADD_1, ADD_0.

Figure 3:
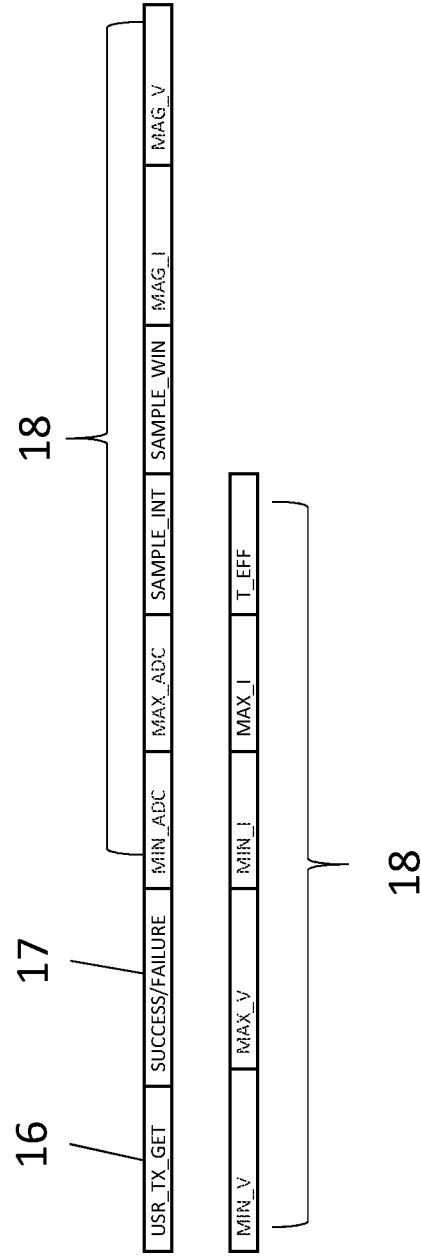
FIG. 3 is an illustration of the get parameter command, showing the get parameter command and get parameter response message.

FIG. 3 is an illustration of the get parameter command, showing the get parameter command and get parameter response message. The coordinator can obtain the set of parameters that a smart meter uses to calculate power and energy by transmitting the get parameter command. The get parameter command comprises a communication type identification field (USR_RX_GET) 14, a command type identification field (COM_PARAM) 15.

When the get parameter command is received by the smart meter being addressed, the smart meter transmits a get parameter response message back to the coordinator. The get parameter response message comprises of a communication type identification field (USR_TX_GET) 16, a command type identification field (COM_PARAM) 17, and a plurality of parameters 18, that includes words MIN_ADC, MAX_ADC, SAMPLE_INT, SAMPLE_WIN, MAG_I, MAG_V, MIN_V, MAX_V, MIN_I, MAX_I, and T_EFF.

Figure 4:
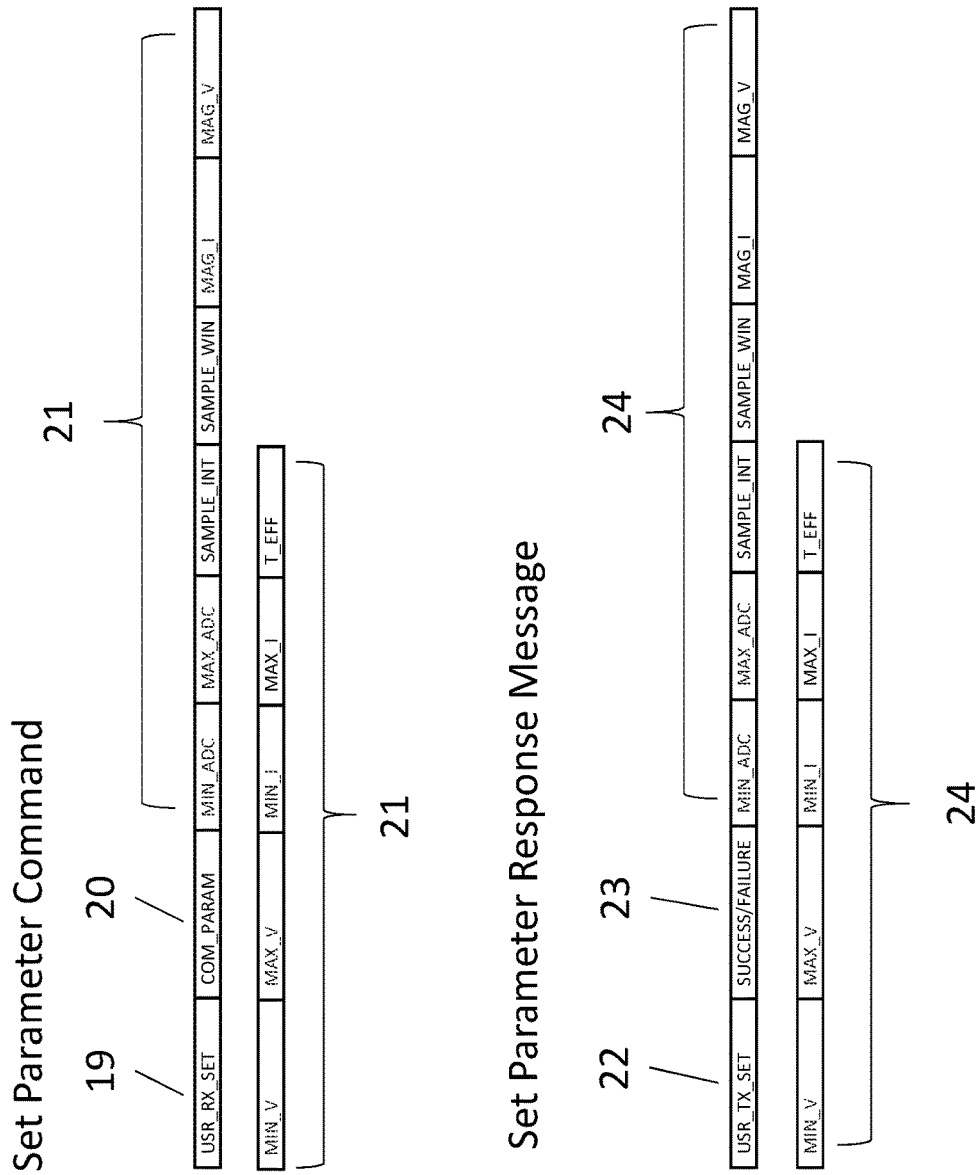
FIG. 4 is an illustration of the set parameter command, showing the set parameter command and set parameter response message.

FIG. 4 is an illustration of the set parameter command, showing the set parameter command and set parameter response message. The coordinator 2 can set the parameters that a smart meter 3 uses to calculate power and energy by transmitting the set parameter command. The set parameter command comprises of a communication type identification field (USR_TX_SET) 19, a command type identification field (COM_PARAM) 20, and a plurality of parameters 21, that includes of words MIN_ADC, MAX_ADC, SAMPLE_INT, SAMPLE_WIN, MAG_I, MAG_V, MIN_V, MAX_V, MIN_I, MAX_I, and T_EFF.

When the set parameter command is received by the smart meter being addressed, the smart meter transmits a obtain parameter response message back to the coordinator. The set parameter response message comprises of a communication type identification field (USR_TX_SET) 22, a command type identification field (COM_PARAM) 23, and a plurality of parameters 24, that includes of words MIN_ADC, MAX_ADC, SAMPLE_INT, SAMPLE_WIN, MAG_I, MAG_V, MIN_V, MAX_V, MIN_I, MAX_I, and T_EFF.

FIG. 5 is an illustration of the get data command, showing the get data command and get data response message. The get data command comprises of a communication type identification field (USR_RX_GET) 25, command type identification field (COM_DATA) 26.

When the get data command is received by the smart meter being addressed, the smart meter transmits a get data response message back to the coordinator. The get data response message comprises of a communication type identification field (USR_TX_GET) 27, a command type identification field (COM_DATA) 28, and a plurality of data 29, that includes of words RMS_V, RMS_I, POWER_1, POWER_0, ENERGY_1, ENERGY_0, SM_V, SM_I, and STATUS.

Figure 6:
FIG. 6 is an illustration of the reset command, showing the reset command and reset response message.

FIG. 6 is an illustration of the reset command, showing the reset command and reset response message. The reset command comprises of a communication type identification field (RESET) 30, a command value field (flagreset) 31, and the reset energy value 32 that includes words ENERGY_RESET_VALUE1 and ENERGY_RESET_VALUE0.

When the reset command is received by the smart meter being addressed, the smart meter transmits a reset response message back to the coordinator. The reset response message comprises of a communication type identification field (USR_TX_GET) 33, status of the reset 34 given by SUCCESS or FAILURE, a command value field (flag) 35, and the energy reset value to 36 that comprises words, ENERGY_RESET_VALUE1 and ENERGY_RESET_VALUE0.

Figure 7:
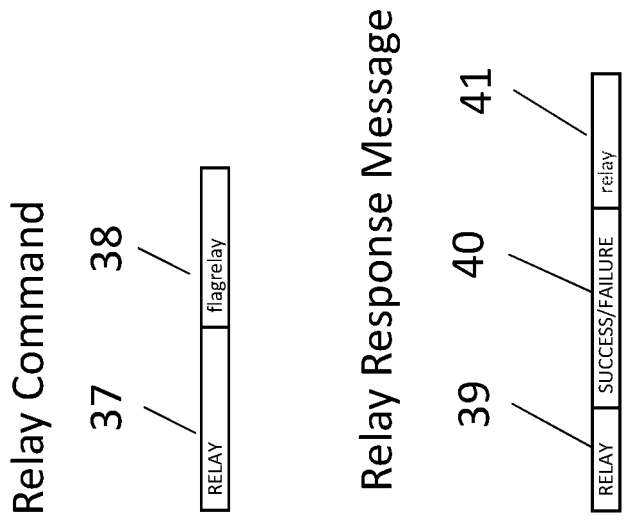
FIG. 7 is an illustration of the relay command, showing the relay command and relay response message.

FIG. 7 is an illustration of the relay command, showing the relay command and relay response message. The coordinator can control a relay to cut off the power line from the power line source by transmitting the relay command. The relay command comprises a communication type identification field (RELAY) 37 and a command value field (flag) 38.

When the relay command is received by the smart meter 3 being addressed, the smart meter 3 transmits a relay response message back to the coordinator 2. The relay response message comprises a communication type identification field (RELAY) 39, status of the reset 40 given by SUCCESS or FAILURE, a command value field (relay) 41.

Figure 8:
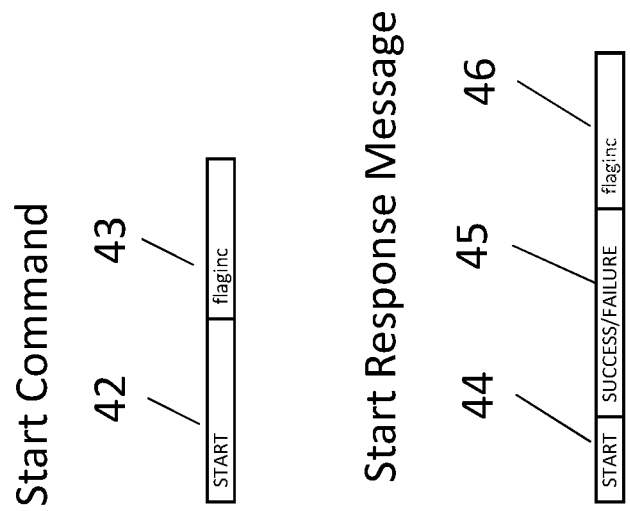
FIG. 8 is an illustration of the start command, showing the start command and start response message.

FIG. 8 is an illustration of the start command, showing the start command and start response message. The start command comprises of a communication type identification field (START) 42, and a command value field (flaginc) 43.

When the start command is received by the smart meter being addressed, the smart meter transmits a start response message back to the coordinator. The start response message comprises of a communication type identification field (START) 44, status of the reset 45 given by SUCCESS or FAILURE, a command value field (flaginc) 46.

FIG. 9 is an illustration of the calibration command, showing the calibration command and calibration response message. The coordinator 2 can start a voltage, current, power, and energy calibrations in the smart meter being addressed by transmitting the calibration command. The calibration command comprises a communication type identification field (CALIBRATE) 47, and a command value field includes of words V_CAL 48, I_CAL 49, and T_CAL 50.

When the start command is received by the smart meter being addressed, the smart meter transmits a calibration response message back to the coordinator. The calibration response message comprises of a communication type identification field (CALIBRATE) 51, status of the calibration 52 given by SUCCESS or FAILURE, a command value field includes of words MAG_V 53, MAG_I 54, and T_EFF 55.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W). To describe the features of the present disclosure in more detail refer now to the following description in conjunction with the accompanying Figures.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A data communication method implemented by a smart meter, comprising:
    receiving, by the smart meter, a smart meter calibration command from a coordinator,
    wherein the smart meter calibration command includes at least one of: a communication type identification field or a first command value field including at least one of: a first voltage field V_CAL, a first current field I_CAL, or a first energy field T_CAL, and
    wherein the smart meter calibration command initiates at least one of: voltage, current, or energy calibrations in the smart meter; and
    sending, by the smart meter, a smart meter calibration response message to the coordinator,
    wherein the smart meter calibration response message includes at least one of: the communication type identification field, an operation status field, or a second command value field, and
    wherein the second command value field includes at least one of: a second voltage field MAG_V, a second current field MAG_I, or a second energy field T_EFF.

2. The data communication method of claim 1, wherein in response to the smart meter calibration command being received by the smart meter, the smart meter calibration response message is generated and sent to the coordinator.

3. The data communication method of claim 1, wherein the communication type identification field is set to CALIBRATE in both the smart meter calibration command and the smart meter calibration response message.

4. The data communication method of claim 1, wherein the MAG_V is calculated by dividing the V_CAL by a measured average voltage root-mean-square of N-samples.

5. The data communication method of claim 1, wherein the MAG_I is calculated by dividing the I_CAL by a measured average current root-mean-square of N-samples.

6. The data communication method of claim 1, wherein the T_EFF is calculated by dividing a calibration ENERGY value measured in a time period T_CAL by a measured POWER 47 and a number of cycles in the T_CAL.

7. The data communication method of claim 1, wherein the coordinator receives the smart meter calibration command from a local server.

8. A non-transitory computer-readable medium storing executable instructions that, in response to execution, cause a smart meter to perform operations comprising:
    receiving, by the smart meter, a smart meter calibration command from a coordinator,
    wherein the smart meter calibration command includes at least one of: a communication type identification field or a first command value field including at least one of: a first voltage field V_CAL, a first current field I_CAL, or a first energy field T_CAL, and
    wherein the smart meter calibration command initiates at least one of: voltage, current, or energy calibrations in the smart meter; and
    sending, by the smart meter, a smart meter calibration response message to the coordinator,
    wherein the smart meter calibration response message includes at least one of: the communication type identification field, an operation status field, or a second command value field, and
    wherein the second command value field includes at least one of: a second voltage field MAG_V, a second current field MAG_I, or a second energy field T_EFF.

9. The non-transitory computer-readable medium of claim 8, wherein in response to the smart meter calibration command being received by the smart meter, the smart meter calibration response message is generated and sent to the coordinator.

10. The non-transitory computer-readable medium of claim 8, wherein the communication type identification field is set to CALIBRATE in both the smart meter calibration command and the smart meter calibration response message.

11. The non-transitory computer-readable medium of claim 8, wherein the MAG_V is calculated by dividing the V_CAL by a measured average voltage root-mean-square of N-samples.

12. The non-transitory computer-readable medium of claim 8, wherein the MAG_I is calculated by dividing the I_CAL by a measured average current root-mean-square of N-samples.

13. The non-transitory computer-readable medium of claim 8, wherein the T_EFF is calculated by dividing a calibration ENERGY value measured in a time period T_CAL by a measured POWER 47 and a number of cycles in the T_CAL.

14. The non-transitory computer-readable medium of claim 8, wherein the coordinator receives the smart meter calibration command from a local server.

15. A smart meter, comprising:
a processor; and
a non-transitory computer-readable medium storing executable instructions that, in response to execution by the processor, cause the smart meter to perform operations comprising:
receiving, by the smart meter, a smart meter calibration command from a coordinator, wherein the smart meter calibration command includes at least one of: a communication type identification field or a first command value field including at least one of: a first voltage field V_CAL, a first current field I_CAL, or a first energy field T_CAL, and wherein the smart meter calibration command initiates at least one of: voltage, current, or energy calibrations in the smart meter; and
sending, by the smart meter, a smart meter calibration response message to the coordinator, wherein the smart meter calibration response message includes at least one of: the communication type identification field, an operation status field, or a second command value field, and wherein the second command value field includes at least one of: a second voltage field MAG_V, a second current field MAG_I, or a second energy field T_EFF.

16. The smart meter of claim 15, wherein in response to the smart meter calibration command being received by the smart meter, the smart meter calibration response message is generated and sent to the coordinator.

17. The smart meter of claim 15, wherein the communication type identification field is set to CALIBRATE in both the smart meter calibration command and the smart meter calibration response message.

18. The smart meter of claim 15, wherein the MAG_V is calculated by dividing the V_CAL by a measured average voltage root-mean-square of N-samples.

19. The smart meter of claim 15, wherein the MAG_I is calculated by dividing the I_CAL by a measured average current root-mean-square of N-samples.

20. The smart meter of claim 15, wherein the T_EFF is calculated by dividing a calibration ENERGY value measured in a time period T_CAL by a measured POWER 47 and a number of cycles in the T_CAL.

* * * * *